United States Patent [19]

Jasas et al.

[11] 4,161,102
[45] Jul. 17, 1979

[54] TURBINE ENGINE STARTING SYSTEM

[75] Inventors: Gytis B. Jasas, Toledo, Ohio; Richard L. Trauth, Lambertville, Mich.; Raymond Smith, Monclova, Ohio

[73] Assignee: Teledyne Industries, Inc., Los Angeles, Calif.

[21] Appl. No.: 839,624

[22] Filed: Oct. 5, 1977

[51] Int. Cl.² ............................................. F02C 7/26
[52] U.S. Cl. .......................... 60/39.14 M; 60/39.82 P; 60/39.82 S
[58] Field of Search ................ 60/39.07, 39.14, 39.48, 60/259, 39.82 P, 39.82 S, 39.82 N

[56] References Cited

U.S. PATENT DOCUMENTS

| 2,465,092 | 3/1949 | Harkness et al. | 60/39.82 S |
| 2,982,095 | 5/1961 | Campbell | 60/39.14 |
| 3,093,968 | 6/1963 | Osofsky | 60/39.14 |
| 3,439,495 | 4/1969 | Binsley et al. | 60/39.14 |

FOREIGN PATENT DOCUMENTS 881816 11/1961 United Kingdom ..................... 60/39.14

Primary Examiner—Louis J. Casaregola
Attorney, Agent, or Firm—Gifford, Chandler, VanOphem, Sheridan & Sprinkle

[57] ABSTRACT

A starting system is provided for a turbine engine of the type having a housing, a turbine shaft, and turbine blades mounted to the turbine shaft. The starting system comprises a housing defining an auxiliary combustion chamber and having a source of combustible fuel and oxidizer connected to the chamber. An ignitor, preferably powered by a magneto rotatably driven by flowing oxygen or fuel, ignites the fuel mixture in the combustion chamber. A fluid passage is connected at one end to the combustion chamber and is open at its other end to the turbine blades on the turbine shaft so that hot exhaust gases expand from the auxiliary combustion chamber, through the fluid passage and impinge upon the turbine blades to rotatably drive the turbine shaft. When the rotational speed of the turbine shaft achieves a predetermined amount, the main combustion chamber of the turbine engine is ignited in the conventional fashion. However, in order to further insure ignition of the turbine engine, preferably a portion of the exhaust gases from the auxiliary combustion chamber is diverted to and preheats the turbine engine main combustion chamber.

7 Claims, 3 Drawing Figures

TURBINE ENGINE STARTING SYSTEM

BACKGROUND OF THE INVENTION

I. Field of the Invention

The present invention relates to a turbine engine starting system.

II. Description of the Prior Art

The previously known gas turbine engines, and particularly smaller units commonly known as auxiliary power units, typically employ electric motors to both pump the fuel to the engine and to rotatably drive the turbine shaft in order to start the turbine engine. The starting motors must produce sufficient torque to rotatably drive the turbine shaft to a high enough speed so that sufficient compressed air and fuel is obtained for the initiation of efficient combustion in the turbine engine. Moreover, sufficient heat or live flame energy must be supplied to the main combustion chamber of the turbine engine in order to initiate self sustaining combustion in the main combustion chamber.

It has been the previous practice with such turbine engines to power the electric starting motors from batteries and to also couple the batteries through high tension coils and spark plugs in order to fire or ignite the combustion chamber. The batteries and electric motor used to start the turbine engine are not only expensive but are also heavy and bulky in construction.

These previously known gas turbine engine starting systems, while reasonably reliable at normal operating conditions, are unreliable in sub-zero temperatures and/or very low ambient pressures (for example, 2–10 psia). During such adverse operating conditions, not only is the electrical energy output from the batteries reduced but also more electrical energy is required to rotatably drive the gas turbine engine rotor to a point at which the turbine engine can begin self-sustaining combustion. At times, however, the electrical energy from the battery is depleted before the gas turbine engine can be started.

Still another previously known turbine engine starting system employs stored hydraulic pressure which rotatably drives an electric motor to produce the required electrical energy. Such systems, however, are expensive in construction and ineffective when the hydraulic pressure is depleted.

As the result of the above mentioned factors, the previously known turbine engine starting systems have been designed as a compromise between the desired reliability, cost, and multi-start capability for the turbine engine.

SUMMARY OF THE PRESENT INVENTION

The present invention overcomes the above mentioned disadvantages of the previously known turbine engine starting systems by providing such a starting system having high reliability, low cost, and good multi-start capability even during adverse operating conditions of extremely low temperatures and pressures.

In brief, the turbine engine starting system according to the present invention comprises an auxiliary combustion chamber having a source of combustible fuel and oxidizer connected to the combustion chamber. A fluid passage is connected at one end to the auxiliary combustion chamber and at its other end is open to the turbine blades. Thus, upon combustion of the fuel in the auxiliary combustion chamber, the resultant hot combustion gases expand through the fluid passage and impinge upon the turbine blades to thereby rotatably drive the turbine blades and, hence, the rotor.

Ignition of the fuel within the auxiliary combustion chamber is preferably achieved by means of an electrical igniter coupled to a magneto. The magneto in turn is rotatably driven or powered by the fuel or oxygen flow into the auxiliary combustion chamber. Consequently, by this arrangement the momentum of the flowing fuel or oxygen is harnessed and converted into electrical power for igniting the fuel thus eliminating the need of battery power for ignition.

A portion of the hot exhaust gases from the auxiliary combustion chamber is preferably diverted and injected with supplemental oxygen into the main combustion chamber for the turbine engine. This provides the required heat and/or live flame energy to the main combustion chamber necessary to initiate self-sustaining combustion within the main combustion chamber.

As will become more clearly apparent as the description proceeds, the gas turbine engine starting system according to the present invention eliminates the previously required electric motors for cranking or rotatably driving the turbine rotor. In addition, the flowing fuel or oxygen produces the necessary electrical power via momentum exchange to ignite the oxygen-fuel mixture in the auxiliary combustion chamber thereby virtually eliminating the need for auxiliary electrical power sources.

Lastly, unlike the previously known devices, the turbine engine starting system according to the present invention can effectively operate during very low temperature and pressure conditions without the deterioration associated with the previously required electric batteries.

BRIEF DESCRIPTION OF THE DRAWINGS

The gas turbine engine starting system according to the present invention will be better understood upon reference to the following detailed description when read in conjunction with the accompanying drawings, wherein like reference characters refer to like parts throughout the several views and in which.

DETAILED DESCRIPTION OF THE PRESENT INVENTION

Figure 1:
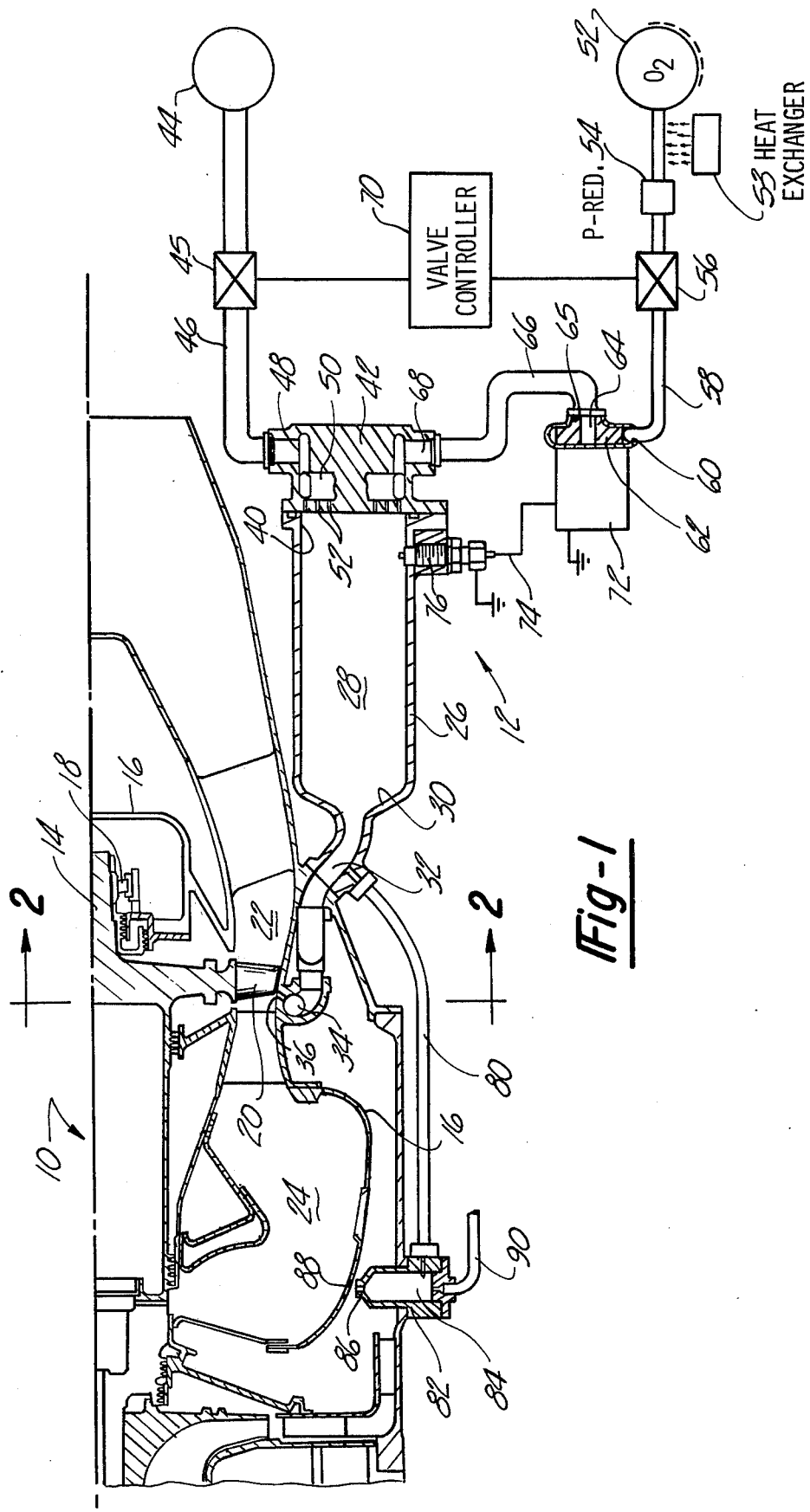
FIG. 1 is a fragmentary diagrammatic and partial cross-sectional view illustrating the gas turbine engine starting system of the present invention.

With reference first to FIG. 1, a gas turbine engine 10 is thereshown employing the turbine engine starting system 12 according to the present invention. The turbine engine 10 is of any conventional construction and includes a rotor 14 rotatably journalled in a support housing 16 by appropriate bearings 18. A plurality of turbine blades 20 (only one of which is shown in FIG. 1) is secured to the rotor 14 and disposed in an exhaust gas passageway 22 formed in the support housing 16. The combustion housing 17 defines a main combustion chamber 24 forwardly of the turbine blade 20 so that, during normal operating conditions, combustion gases from the main combustion chamber 24 expand and are expelled through the exhaust passageway 22 which rotatably drives the rotor 14 via the turbine blades 20. The gas turbine engine 10 thus far described is conventional in construction.

The turbine engine starting system 12 according to the present invention generally comprises an auxiliary combustion chamber housing 26 which defines an elongated and generally cylindrical auxiliary combustion chamber 28. One axial end 30 of the combustion chamber 28 is coupled by a fluid passage means 32 to a manifold 34 positioned in the support housing 16 adjacent the turbine blades 20. At least one fluid port 36 in the support housing 16 fluidly connects the manifold 34 to the exhaust passageway 22. In addition, the fluid ports 36 are angled with respect to the turbine engine 10 and in correlation with the tip configuration of the turbine blades 20 so that fluid flow from the manifold 34 and through the fluid ports 36 impinges upon the turbine blades 20 in the exhaust passageway 22. The impingement of the fluid on the turbine blades rotatably drives the turbine rotor 14.

Figure 2:
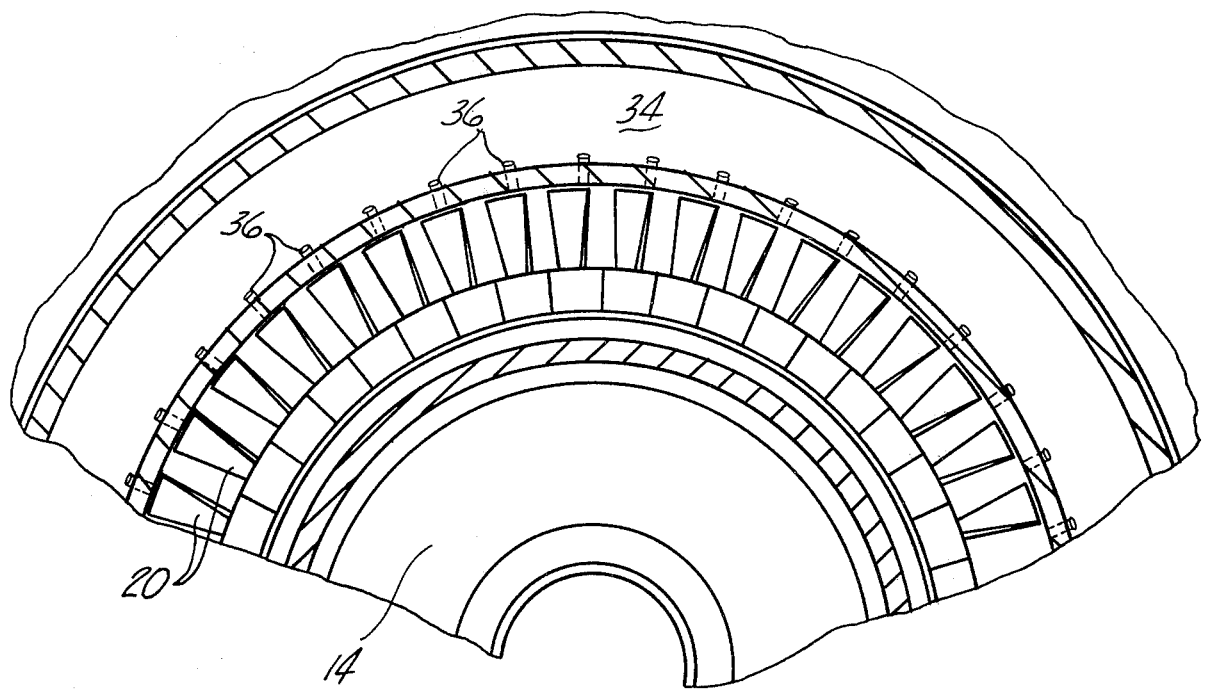
FIG. 2 is a fragmentary cross-sectional view taken substantially along line 2—2 in FIG. 1 and enlarged for clarity.

With reference to FIGS. 1 and 2, the manifold 34 can extend annularly around the turbine blades 20 in the support housing 16 and includes a plurality of circumferentially spaced ports 36. In this case fluid flow through the ports 36 would simultaneously impinge upon a plurality of turbine blades 20.

Referring back to FIG. 1, the other axial end 40 of the auxiliary combustion chamber 28 is closed by means of an end cap 42. A source 44 of fuel is coupled via an on/off valve 45 by a fluid line 46 and fluid passage means 48 formed in the end cap 42 to a fuel distributor 50 contained in the cap 42. The fuel distributor 50 is fluidly coupled to the auxiliary combustion chamber 28 via a plurality of small ports 51 in the cap 42.

A source 52 of pressurized oxygen or oxidizer is fluidly coupled through a pressure reducer 54 and an on/off valve 56 to a fluid connector 58. If the oxygen is liquified, a heat exchanger 53 is thermally coupled to the oxygen between the source 52 and the pressure reducer 54 in order to gasify the oxygen. The fluid connector 58 in turn is coupled to the input 60 of a turbine 62 coupled to and adapted to rotatably drive a shaft 64. The output 65 from the turbine 62 in turn is connected by a fluid conduit 66 to fluid passage means 68 formed in the end cap 42. The fluid passage means 68, like the passage means 48, is connected to the fuel distributor 50.

A valve controller 70 is connected to and actuates the valves 45 and 56. Thus when the valve controller 70 opens the valves 45 and 56, fuel flows from the source 44 out through the ports 51 and into the auxiliary combustion chamber 28. Sequentially, oxygen flows from the pressurized source 52 through the turbine 62 and into the chamber 28 via the fuel distributor 50. The turbine shaft 64 is coupled to and rotatably drives an electric energy generation means 72, e.g. an electrical generator or magneto, and supplies electrical power via line 74 to an electrical igniter 76 positioned within the auxiliary combustion chamber 28. Consequently, actuation of the valves 45 and 56 by the controller 70 not only provides a combustible fuel-oxygen mixture within the interior of the combustion chamber 28 but also provides the electrical energy via momentum exchange necessary to ignite the mixture within the chamber 28. Thus, auxiliary electrical energy from batteries or the like is not required.

Ignition of the fuel-oxygen mixture within the auxiliary combustion chamber 28 causes an expansion of hot gases through the fluid passage means 32 to the manifold 34 and out through the port or ports 36. These gases impinge upon the turbine blades 20 to rotatably drive the turbine rotor 14. When the turbine rotor 14 achieves a predetermined rotational speed, self-sustaining combustion within the main combustion chamber 24 will occur thereby completing the engine start up.

In order to increase the heat or live flame energy input to the main combustion chamber 24 and thereby ensure engine ignition, preferably a portion of the hot gases from the fluid passage means 32 is diverted by a fluid conduit 80 and fed to a central chamber 84 of an igniter 82. The igniter 82 and central chamber 84 is open through a nozzle 86 and a registering opening 88 in the combustion housing 17 so that combustion gases from the conduit 80 are injected into the main combustion chamber 24 of the turbine engine 10. In addition, a relatively small amount of pressurized oxygen from the source 52 is fed via a conduit 90 into the interior chamber 84 of the ignitor 82 to increase the temperature of the ignition flame within the igniter 82 by increasing the oxygen/fuel ratio.

Figure 3:
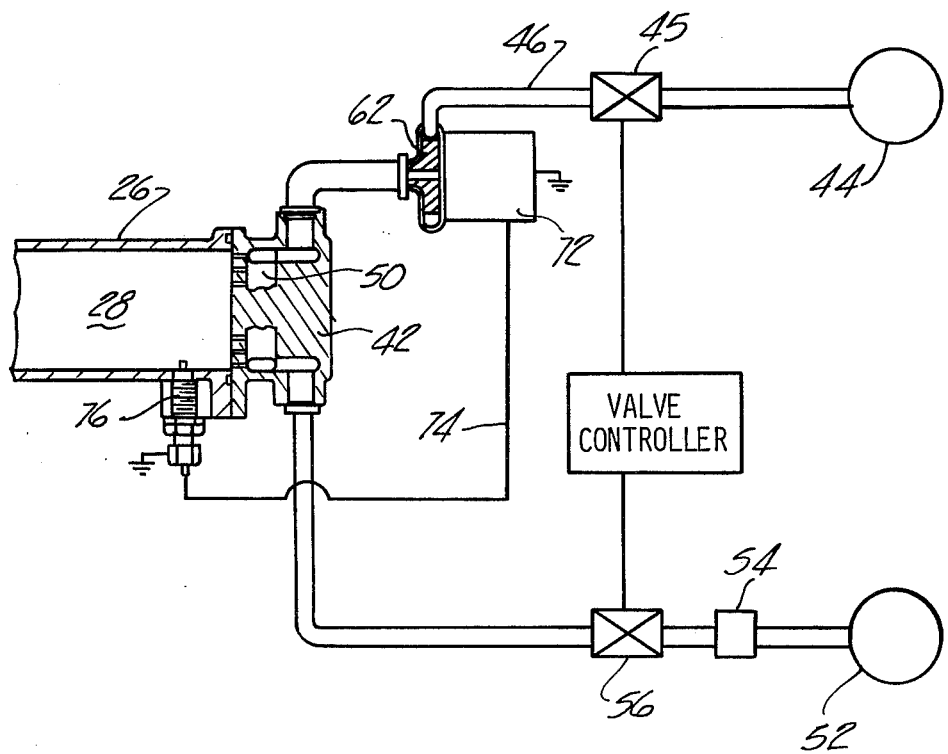
FIG. 3 is a fragmentary diagrammatic view similar to FIG. 1 but with parts removed and illustrating a modification thereof.

With reference now to FIG. 3 a modification of the turbine engine starting system 12 according to the present invention is thereshown in which the turbine 62 is connected in series with the fluid conduit 46 connecting the fuel source 44 to the fuel distributor 50 in the end cap 42. In this modification, the flow energy of the fuel, rather than the oxygen, is harnessed via momentum exchange to fire the ignitor 76 and ignite the combustible fuel/oxygen mixture in the auxiliary combustion chamber 28. In all other respects, the operation of the starting system 12 illustrated in the modification of FIG. 3 is substantially the same as has been heretofore described and thus for brevity, will not be repeated.

It can thus be seen that the turbine engine starting system 12 according to the present invention eliminates the previously required electric batteries and motors for cranking the turbine along with their disadvantages of low reliability, high cost and weight, and low multi-start capability. The present invention achieves this by means of the auxiliary combustion chamber 28 which produces hot exhaust gases which impinge upon the turbine 20 to rotatably drive the turbine 20 in lieu of electric motors. Moreover, heat and live flame energy is supplied to the main combustion chamber for the turbine engine by tapping a portion of the exhaust gases from the auxiliary combustion chamber 28 which effectively, efficiently, and inexpensively assures rapid start-up of the turbine engine 10.

A still further advantage of the turbine engine starting system 12 according to the present invention is the provision for harnessing the flow energy of the oxygen or fuel from momentum exchange to generate the required electrical energy to ignite the combustible fuel/oxygen mixture in the auxiliary combustion chamber 28. By doing so, reliable gas turbine engine starters can be achieved in operating conditions of extremely low temperature and pressure with a reliability that has not been heretofore achieved. It will be understood, however, that other means, such as manually actuated piezoelectric crystals, can also be used to power the igniter 76.

Having described our invention, many modifications thereto will become apparent to those skilled in the art to which it pertains without deviating from the spirit of the invention as defined by the scope of the appended claims.

We claim:

1. A starting system for a turbine engine having a support housing, a main combustion chamber housing within the support housing, a turbine shaft, and turbine blades mounted on said shaft, said starting system comprising:

an auxiliary combustion chamber housing defining an auxiliary combustion chamber, a source of combustible fuel and pressurized oxidizer fluidly connected to said auxiliary combustion chamber, means for igniting said fuel in said auxiliary combustion chamber, said igniting means further comprising an electrically powered igniter coupled to said auxiliary combustion chamber housing and adapted to ignite said combustible fuel in said auxiliary combustion chamber, and electrical energy generating means connected to said igniter, said electrical energy generating means comprising an electrical generator and a turbine connected to and adapted to rotatably drive said generator, said turbine being fluidly disposed in a fluid line connecting said oxidizer source to said combustion chamber, and fluid passage means having one end open to said auxiliary combustion chamber and having its other end open to said turbine blades on said shaft whereby combustion gases flow from said auxiliary combustion chamber through said fluid passage means and impinge upon said turbine blades to thereby rotatably drive said turbine shaft.

2. The invention as defined in claim 1 wherein said fluid passage means further comprises a fluid manifold positioned annularly around said turbine shaft adjacent and radially outwardly from said turbine blades, and a plurality of circumferentially spaced fluid ports, each port having one end open to said manifold and its other end open to said turbine blades whereby fluid flow through said fluid ports impinges upon said turbine blades.

3. The invention as defined in claim 1 wherein said starting system further comprises means for diverting a portion of the exhaust gases from said auxiliary combustion chamber and into said main combustion chamber.

4. The invention as defined in claim 3 wherein said last mentioned means further comprises an igniter, said igniter having a housing defining an interior chamber, a fluid conduit open at one end to said auxiliary combustion chamber and open at its other end to said interior chamber, and a fluid nozzle for directing fluid from said interior chamber into said main combustion chamber.

5. The invention as defined in claim 4 and further comprising a source of pressurized oxygen fluidly coupled to said igniter interior chamber.

6. The invention as defined in claim 1 wherein said oxidizer source is a source of pressurized oxygen.

7. A starting system for a turbine engine having a support housing, a main combustion chamber housing within the support housing, a turbine shaft, and turbine blades mounted on said shaft, said starting system comprising:

an auxiliary combustion chamber housing defining an auxiliary combustion chamber, a source of combustible fuel fluidly connected to said auxiliary combustion chamber by a first conduit means so that fuel flows from the fuel source and to the auxiliary combustion chamber, a source of oxidizer fluidly connected to the auxiliary combustion chamber by a second conduit means so that oxidizer flows from said oxidizer source and to said auxiliary combustion chamber, means for igniting said fuel in said auxiliary combustion chamber, said igniting means further comprising an electrically powered igniter mounted to extend into said auxiliary combustion chamber housing and adapted to ignite said combustible fuel in said auxiliary combustion chamber, and electrical energy generating means connected to said igniter, said energy generating means comprising an electrical generator and a turbine connected to and adapted to rotatably drive said generator, said turbine being fluidly disposed in series with one of said conduit means.

* * * * *